Figure 1:
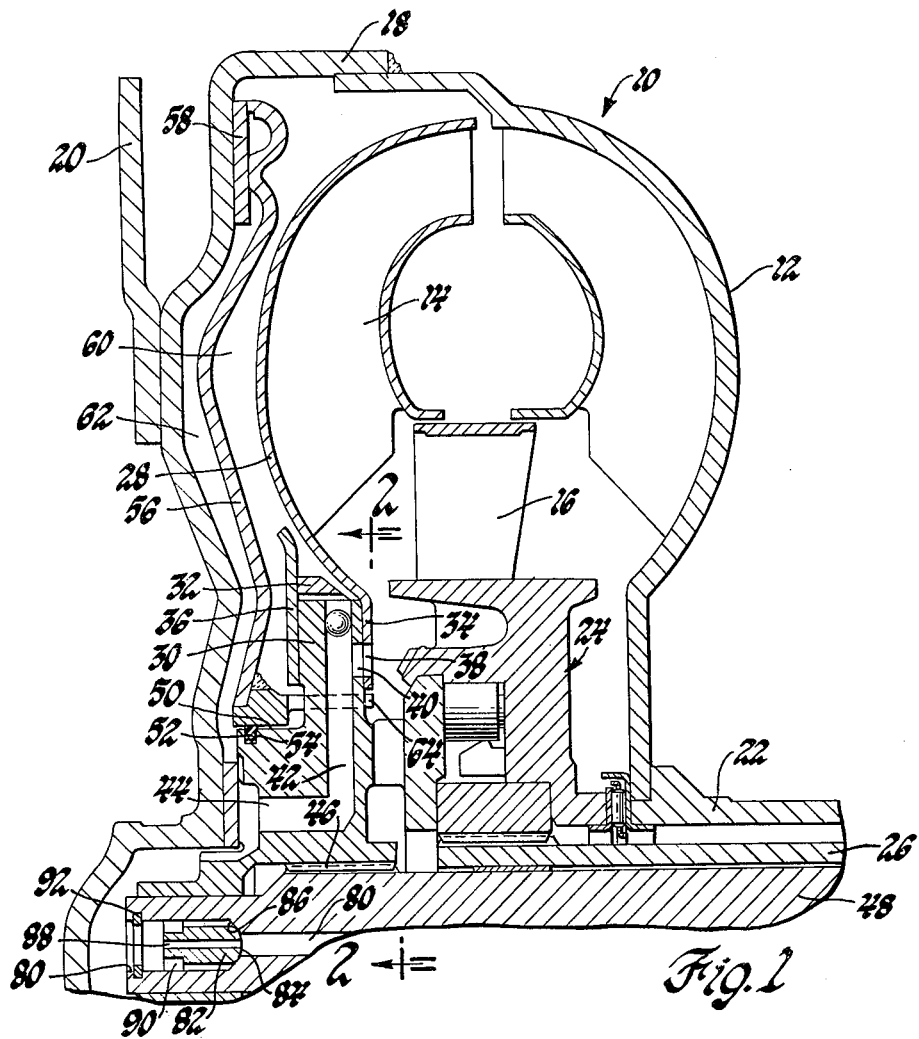

United States Patent [19]
Peterson, Jr. et al.

[11] 3,966,031
[45] June 29, 1976

[54] TORQUE CONVERTER AND SLIPPING CLUTCH

[75] Inventors: Raymond T. Peterson, Jr., Taylor; Paul D. Stevenson, Ann Arbor, both of Mich.

[73] Assignee: General Motors Corporation, Detroit, Mich.

[22] Filed: June 23, 1975

[21] Appl. No.: 589,594

[52] U.S. Cl. ................................. 192/3.3; 192/54; 251/313
[51] Int. Cl.² ................... F16D 39/00; F16D 47/06
[58] Field of Search ................. 192/3.29, 3.3, 3.31, 192/3.33, 54, 56 F; 74/733

[56] References Cited
UNITED STATES PATENTS

| | | | |
|---|---|---|---|
| 3,537,553 | 11/1970 | Olsen | 192/3.33 |
| 3,730,315 | 5/1973 | Annis et al. | 192/3.3 |
| 3,734,251 | 5/1973 | Annis et al. | 192/3.3 |

*Primary Examiner*—Benjamin W. Wyche
*Attorney, Agent, or Firm*—D. F. Scherer

[57] ABSTRACT

A torque converter and slipping clutch assembly wherein the clutch engagement force is determined by the torque transmitted by the turbine of the torque converter. The clutch engagement force is controlled by differential pressure on opposite sides of the clutch plate. The pressure on one side of the clutch plate is determined by fluid flow through a variable restriction and a fixed restriction arranged in series. The size of the variable restriction opening changes in response to the torque transmitted by the turbine.

3 Claims, 2 Drawing Figures

U.S. Patent   June 29, 1976   3,966,031

TORQUE CONVERTER AND SLIPPING CLUTCH

This invention relates to torque converter and slipping clutch assemblies and more particularly to said assemblies wherein the engagement force of the clutch is responsive to the torque transmitted by the turbine of the torque converter.

It is an object of this invention to provide an improved torque converter and clutch assembly having a variable opening fluid flow restriction with the size thereof controlled by the amount of torque transmitted by the turbine of the torque converter.

Another object of this invention is to provide in a torque converter and slipping clutch assembly an improved turbine and hub structure wherein the turbine and hub are drivingly connected through resilient means to permit relative rotary movement therebetween whereby said movement determines the size of an opening of a passage formed in said turbine and hub so that fluid flow through said passage is controlled by the amount of torque transmitted by the turbine to the hub.

Another object of this invention is to provide in a torque converter and slipping cluth assembly an improved turbine and hub structure wherein the turbine and hub are resiliently drivingly connected to permit limited relative movement therebetween and wherein an annular flange portion of the turbine is disposed adjacent a portion of the side of the hub and cooperative openings therein form a restriction which is variable in response to the relative movement of the turbine and hub.

Figure 2:
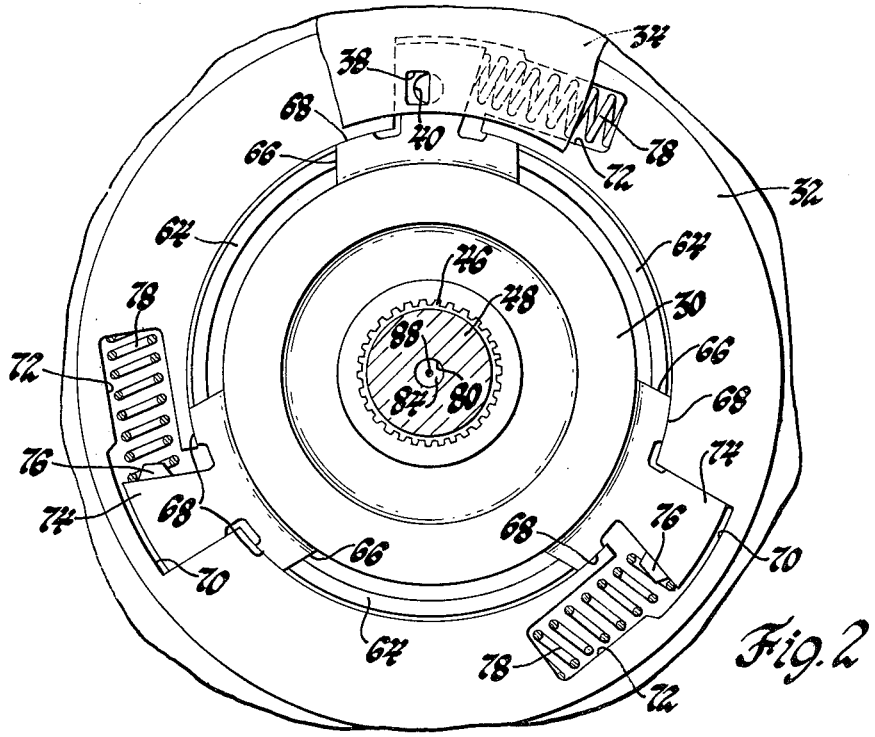

These and other objects and advantages of the present invention will be more apparent from the following description and drawings in which:

FIG. 1 is a cross-sectional elevational view of a torque converter and clutch assembly; and FIG. 2 is a view taken along line 2—2 of FIG. 1.

Referring to the drawings, there is shown in FIG. 1 a torque converter 10 having an impeller 12, a turbine 14 and a stator 16. The impeller 12 is welded or otherwise secured to an input shell 18 to which is secured a drive lug 20 adapted to be connected to and driven by a prime mover such as an internal combustion engine, not shown. The impeller 12 is also secured to a sleeve shaft 22 which is adapted to drive the conventional internal/external type gear pump, not shown, such that control fluid can be supplied in a well-known manner. The stator 16 is connected through a conventional one-way device 24 to a stator shaft 26 which shaft 26 is connected to the stationary housing of the transmission, not shown.

The turbine 14 includes a bladed portion 28 and a turbine hub 30. The bladed portion 28 of the turbine 14 is constructed in accordance with conventional techniques, as far as blading angle and installation is concerned. The bladed portion includes a spacer member 32 which is secured thereto and also includes two annular radially inward projecting portions 34 and 36 which are positioned closely adjacent the outer side portions of the turbine hub 30 and are secured to the spacer member 32. An opening or aperture 38 is formed in the annular portion 34 and is alignable with an opening or aperture 40 formed in the turbine hub 30. The opening 40 is in fluid communication with a passage 42 formed radially in the hub 30 which passage 42 is in communication with an axially extending passage 44 also formed in the hub 30. The inner diameter of hub 30 has formed thereon a spline 46 which is drivingly connected to a turbine output shaft 48. The turbine shaft 48 is adapted to be connected to a planetary gearing arrangement of any conventional design such as that shown in Winchell et al, U.S. Pat. No. 3,321,056. The turbine hub 30 also has formed thereon a smooth cylindrical portion 50 in which is disposed a seal ring 52 which is positioned in a groove 54 formed in a cylindrical portion 50. A single plate clutch member 56 is slidably disposed on the cylindrical portion 50 and seal 52 and has an outer friction surface 58 adapted to frictionally engage the input shell 18. The clutch plate 56 and the cylindrical portion 50 and seal 52 cooperate with the turbine 14 and input shell 18 to form an engagement chamber 60 and a disengagement chamber 62 formed on opposite sides of the clutch plate 56. The clutch plate 56 also has a plurality of tangs 64 which provide a driving connection between clutch plate 56 and the turbine hub 30 by engaging shoulder 66 formed on the turbine hub 30 in a space disposed between the turbine hub 30 and the spacer 32.

As can be seen in FIG. 2, the spacer 32 is supported on a plurality of substantially constant radius surfaces 68 formed on the hub 30. A plurality of radial slot openings 70 and substantially chordal spring pockets 72 are also formed in the spacer 32. The hub 30 has formed thereon a plurality of radially extending drive lugs 74 which are disposed in the radial slots 70 and said lugs 74 have formed thereon a spring seat 76. A plurality of compression springs 78 are disposed between the drive lugs 74 and the spacer 32 such that springs permit relative rotation between the hub 30 and spacer 32 to control the opening and closing of apertures 38 and 40 in such a manner as to control fluid flow therethrough in response to torque transmitted from the bladed portion 28 of the turbine 14 to the hub 30 and then to the turbine output shaft 48.

The engagement chamber 60 is in fluid communication with and subject to the pressure of the fluid in the torque converter 10 and the disengagement chamber 62 is in fluid communication with an axially extending passage 80 formed in the turbine output shaft 48. A one-way check valve and restriction 82 is slidingly disposed in the passage 80 and has a rounded end 84 adapted to seat against a shoulder 86 formed in the passage 80, a central restriction passage 88 and a plurality of fluted lands 90. A stop ring 92 is disposed in the passage 80 to limit movement of the check valve 82 in one direction. When the check valve 82 is in the position shown, fluid pressure from the disengagement chamber 62 must pass through the fixed central restriction 88 and thereby fluid flow from the disengagement chamber 62 is controlled. When fluid pressure is admitted through passage 80, the check valve 82 will move against the stop 92 such that free flow through the fluted lands 90 to the disengagement chamber 62 is permitted. The control of fluid flow to and from the converter can be accomplished in a manner similar to that disclosed in the Annis et al patent, U.S. Pat. No. 3,730,315. The aperture 38 formed in the annular portion 34 of turbine 14 is in fluid communication with the fluid pressure in the torque converter. The passage 44 is in fluid communication with the disengagement chamber 62. When the apertures 38 and 40 are substantially open as shown in FIG. 2, free fluid flow between the torque converter 10 and the disengagement chamber 62 is permitted. However, when the apertures 38 and 40 are rotated relative to each other to close the opening formed thereby, the fluid flow to the disengagement chamber 62 is reduced accordingly. Since a fixed restriction outlet is provided from the fluid chamber, a reduction in pressure in the disengagement chamber will occur to permit the clutch 56 to be engaged to the input shell 18. The apertures 38 and 40 will move relative to each other when sufficient torque is transmitted from the bladed member 28 of the turbine 14 to the turbine hub 30 in an amount sufficient to compress the springs 78. As can be seen in FIG. 2, the apertures 38 and 40 is rotated sufficiently relative to each other, can substantially prevent fluid communication from the torque converter to the disengagement chamber 62. The compression springs 78 are designed such that at a predetermined torque transmission through the bladed element 28 the apertures 38 and 40 will be aligned sufficiently to provide fluid flow which will maintain the clutch 56 in a slipping engagement relation with the input shell 18, which slipping engagement will be sufficient to transmit the remainder of the input torque from the input shell 18 to the turbine hub 30. If the turbine 14 should transmit more than the predetermined torque, the apertures 38 and 40 will move more toward the closing position such that the engagement force of clutch 56 will be increased to transmit more torque to the clutch 56 and less torque through the turbine 14. If the torque load on turbine 14 should decrease, the apertures 38 and 40 will be moved relatively in the opposite direction to permit more fluid flow which will result in higher pressure in the disengagement chamber 62 to reduce the torque capacity of the clutch 56. Thus, it can be seen that the clutch engagement force is conditioned upon the transmission of torque by the turbine 14.

Obviously, many modifications and variations of this present invention are possible in light of the above teachings. It is therefore to be understood that within the scope of the appended claims the invention may be practiced otherwise than as specifically described.

What is claimed is:

1. A torque converter and clutch assembly comprising; impeller means; stator means; turbine means in toroidal fluid flow relation with said impeller means and said stator means including a turbine hub having a plurality of radially extending drive lugs and a plurality of support surfaces adjacent the drive lugs at the radially inner end of the drive lugs, a fluid passage formed through said turbine hub having an opening in one of said drive lugs intermediate the radially inner and outer ends thereof, a spacer member rotatably supported on said support surfaces and including complementary radial openings in which said drive lugs are disposed, a bladed turbine element secured to said spacer and having an annular surface adjacent said drive lugs and an aperture in said annular surface adjacent said fluid passage opening in said one drive lug and cooperating therewith to form a variable fluid flow passage, and spring means disposed in drive relation between said spacer and said turbine hub for transmitting drive torque from said bladed turbine element to said turbine hub and for permitting relative rotation between said turbine element and said turbine hub to control the opening of the variable fluid flow passage; and clutch means axially slidably disposed on and drivingly connected to said turbine hub and being frictionally slippingly engageable with said impeller means in response to an axial engagement force developed in accordance with fluid flow through said variable fluid flow passage, whereby torque transmission through said torque converter and clutch assembly is split so that a predetermined amount is transmitted through said torque converter and the remainder is transmitted through said clutch means to limit the slip speed between said impeller means and said turbine means.

2. A torque converter and clutch assembly comprising; impeller means; stator means; turbine means in toroidal fluid flow relation with said impeller means and said stator means including a turbine hub having a plurality of radially extending drive lugs, a plurality of support surfaces adjacent the drive lugs at the radially inner end of the drive lugs and a cylindrical clutch support surface, a fluid passage formed through said turbine hub having an opening in one of said drive lugs intermediate the radially inner and outer ends thereof, a spacer member rotatably supported on said support surfaces and including complementary radial openings in which said drive lugs are disposed, a bladed turbine element secured to said spacer and having an annular surface adjacent said drive lugs and an aperture in said annular surface adjacent said fluid passage opening in said one drive lug and cooperating therewith to form a variable fluid flow passage, and spring means disposed in drive relation between said spacer and said turbine hub for transmitting drive torque from said bladed turbine element to said turbine hub and for permitting relative rotation between said turbine element and said turbine hub to control the opening of the variable fluid flow passage; and clutch means axially slidably disposed on said cylindrical clutch support surface and being drivingly connected to said turbine hub and frictionally slippingly engageable with said impeller means in response to an axial engagement force developed in accordance with fluid flow through said variable fluid flow passage, whereby torque transmission through said torque converter and clutch assembly is split so that a predetermined amount is transmitted through said torque converter and the remainder is transmitted through said clutch means to limit the slip speed between said impeller means and said turbine means.

3. A torque converter and clutch assembly comprising; impeller means; stator means; turbine means in toroidal fluid flow relation with said impeller means and said stator means including a turbine hub having a plurality of radially extending drive lugs and a plurality of support surfaces adjacent the drive lugs at the radially inner end of the drive lugs, a fluid passage formed through said turbine hub having an opening in one of said drive lugs intermediate the radially inner and outer ends thereof, a spacer member rotatably supported on said support surfaces and including complementary radial openings in which said drive lugs are disposed, a bladed turbine element secured to said spacer and having an annular surface adjacent said drive lugs and an aperture in said annular surface adjacent said fluid passage opening in said one drive lug and cooperating therewith to form a variable fluid flow restriction, and spring means disposed in drive relation between said spacer and said turbine hub for transmitting drive torque from said bladed turbine element to said turbine hub and for permitting relative rotation between said turbine element and said turbine hub to control the size of the variable fluid flow restriction; and clutch means axially slidably disposed on and drivingly connected to said turbine hub and being frictionally slippingly engageable with said impeller means in response to an axial engagement force developed in accordance with pressure drop across said variable fluid flow restriction, whereby torque transmission through said torque converter and clutch assembly is split so that a predetermined amount is transmitted through said torque converter and the remainder is transmitted through said clutch means to limit the slip speed between said impeller means and said turbine means.

* * * * *